US005467246A

United States Patent [19]
Ferri

[11] Patent Number: 5,467,246
[45] Date of Patent: Nov. 14, 1995

[54] ARRANGEMENT FOR EMULATING AN H-TYPE RELAY AIR VALVE WHICH IS UTILIZED IN A RAILWAY BRAKING SYSTEM

[75] Inventor: Vincent Ferri, Pittsburgh, Pa.

[73] Assignee: Westinghouse Air Brake Company, Wilmerding, Pa.

[21] Appl. No.: 126,845

[22] Filed: Sep. 23, 1993

[51] Int. Cl.$^6$ .................................................. H01H 47/00
[52] U.S. Cl. .......................... 361/170; 361/178; 361/142; 361/206
[58] Field of Search .................................. 361/139, 142, 361/143, 152, 160, 170, 178, 206

[56] References Cited

U.S. PATENT DOCUMENTS

| | | | |
|---|---|---|---|
| 4,875,740 | 10/1989 | Takayama | 303/50 |
| 5,104,203 | 4/1992 | Ferri | 303/15 |
| 5,130,657 | 7/1992 | Horning | 324/15 |

Primary Examiner—Jeffrey A. Gaffin
Attorney, Agent, or Firm—John B. Sotak

[57] ABSTRACT

An H-5 relay air valve emulating circuit for use in an electropneumatic railway brake control equipment including an operational amplifier comparator and a solenoid relay. The operational amplifier comparator includes a positive and a negative input and an output. The positive input is connected to an automatic brake cylinder request terminal, while the negative input is connected to a reference signal terminal. The output of the operational amplifier comparator is connected to the electrical coil of the solenoid relay which has a movable heel contact as well as a front and a back contact. The front contact is connected to an independent brake cylinder request terminal, while the back contact is connected to a zero reference terminal. The movable heel contact of the solenoid relay is connected to an independent contact point of a J-relay emulating circuit which is conditioned to either produce 160% of the simulated control pressure signal or to produce 100% of the simulated control pressure signal.

10 Claims, 2 Drawing Sheets

5,467,246

ARRANGEMENT FOR EMULATING AN H-TYPE RELAY AIR VALVE WHICH IS UTILIZED IN A RAILWAY BRAKING SYSTEM

FIELD OF THE INVENTION

This invention relates to a method of emulating an H-type of relay air valve which is used on locomotive brake equipment and, more particularly, to innovative arrangement for electronically emulating circuit for simulating the various functional operations of a pneumatically operated H-5 relay air valve which is combined with a J-relay air valve emulation circuit for effectively controlling the pneumatic pressure in the air brake cylinders from the engineer's cab of a railroad locomotive.

BACKGROUND OF THE INVENTION

In existing locomotive brake control equipment, it is conventional practice to control and operate the braking system by varying the pressure level within the air brake cylinders. For example, the locomotive air brake equipment, which is made and sold by the Westinghouse Air Brake Company, is basically designed to efficaciously meet the present day train handling requirements in which air, under pressure, is employed for controlling the braking of the locomotives as well as the trailing freight cars and/or passenger vehicles. Accordingly, the brake equipment on both freight and passenger locomotives is controlled in accordance with accepted application criteria. The most common type of locomotive air brake equipment presently in revenue service employs pneumatic devices for applying and releasing air pressure in the brake cylinders. These previous pneumatic devices included both the J and H types of relay air valves along with the, conduit or piping, double check valves as well as any other ancillary pneumatic components. It will be appreciated that, when the pneumatic components are appropriately interconnected, they control and establish the braking characteristics which are essential in the operation of the railway train. With the advent of microprocessor and mini-computers, it would be highly advantageous and extremely beneficial to create an alternate or compatible electronic type of brake control arrangement for attaining the necessary braking characteristics for any given railroad locomotive in order to avoid extensive reworking of the piping and replacement of components that are now common with an H- relay air valve changeout.

OBJECTS AND SUMMARY OF THE INVENTION

Accordingly, it is an object of this invention to provide a unique electronic emulator for simulating the operating function of an H-type of relay air valve.

Another object of this invention is to provide a novel circuit arrangement for emulating the functional operations of a given type of H-type relay air valve.

A further object of this invention is to provide a new electronic H-relay air valve emulating circuit for controlling the pneumatic braking on a railway train in accordance with the automatic brake command request and/or the independent brake command request initiated by the engineer.

Yet another object of this invention is to provide a unique method of electronically emulating an H-5 relay air valve device for producing the desired braking characteristics on a locomotive.

Yet a further object of the invention is to provide an emulating circuit for simulating an H-type of relay air valve comprising, an operational amplifier comparator having a pair of inputs and an output, one of the pair of inputs connected to a reference signal, the other of the pair of inputs connected to an automatic brake cylinder request signal, a solenoid relay having an electrical coil connected to the output of the operational amplifier comparator and having at least one movable contact and a pair of stationary contacts, one of the pair of stationary contacts connected to an independent brake cylinder request signal and the other of the pair of stationary contacts connected to a zero pressure signal both of which are connectable by the movable contact to an output terminal.

Still another object of this invention is to provide an electrical emulating circuit which is efficient in operation, reliable in service, simple in design, economical in cost, and durable in use.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
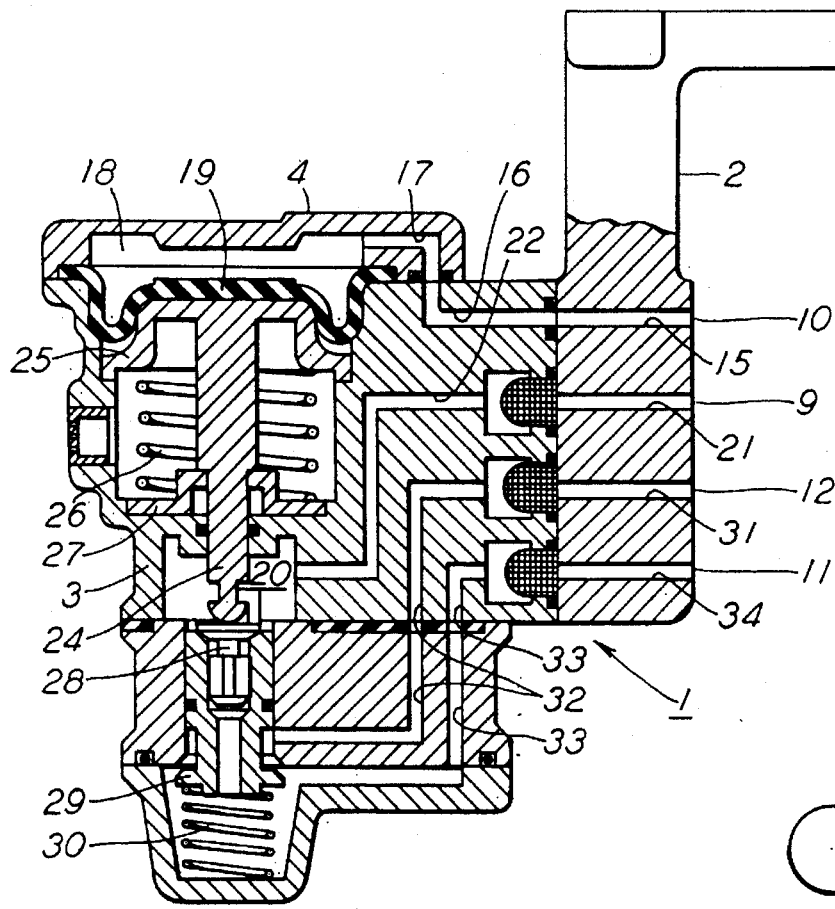
FIG. 1 is a schematic elevational view, mostly in section, of a conventional H-5 relay air valve which is presently used in existing locomotive air brake equipment.

Referring now to the drawings, and in particular to FIG. 1, there is shown an H-5 relay air valve device which is generally characterized by the reference numeral 1. The H-5 relay air valve 1 is a pneumatic single piloted three-way valve which effectively controls the flow of air between a supply, a delivery, and an exhaust port by varying the air pressure supplied to a control port. The H-5 relay air valve 1 includes a pipe bracket mounting portion 2 and a body portion 3. The pipe bracket portion 2 includes a plurality of fluid conveying ports 9, 10, 11, and 12. The control pressure port 10 is connected by passageway 15, 16 and 17 to a control chamber 18 located between a flexible diaphragm 19 and a diaphragm clamping cover 4. The supply pressure port 9 is connected to a volume 20 via ports 21 and 22. It will be seen that the lower end of a piston stem 24 protrudes into the volume 20 and is an integral part of the piston head 25 which intimately contacts the central portion of the diaphragm 19. A helical compression spring 26 is caged between the underside of the piston head 25 and a spring seat 27. The lower end of the piston stem 24 is cooperatively associated with a supply valve 28. As shown, an exhaust valve 29 is located below the supply valve 28 and is urged upwardly by a biasing spring 30. The exhaust port 12 is connectable to the delivery port 11 via passageways 31 and 32, exhaust valve 29, and passageways 33 and 34.

In describing the operation of the H or H-5 type of relay air valve 1, it will be seen that the piloting or control air pressure appearing at port 10 is directed to the chamber 18 via passageways 15, 16, and 17. When this control air pressure builds up to equal or exceed compressive force of the biasing spring 26, the diaphragm 19, piston 25 and piston stem 24 are moved downwardly and to cause the seating of the supply valve 24 so that the delivery port 11 is disconnected from the supply port 9. As the downward movement continues, the exhaust valve 29 becomes unseated so that the delivery port 11 is vented to atmosphere via the passageways 34, 31, the open exhaust valve 29, and the passageways 32, 31 to the exhaust port 12. Now when the control pressure in chamber 18 is vented, the compressive force of the return spring 26 will raise the diaphragm 19, piston 25, piston stem 24 and unseat the supply valve 28 while the biasing spring 30 will seat the exhaust valve 29. Thus, the exhaust port 12 is blanked off, and the supply port 9 is connected to the delivery port 11. In pneumatic locomotive air brake equipment, the delivery port 11 of the H-5 relay air valve is interconnected to a sixty percent (60%) control port of a J-1.6-16 relay valve.

Figure 2:
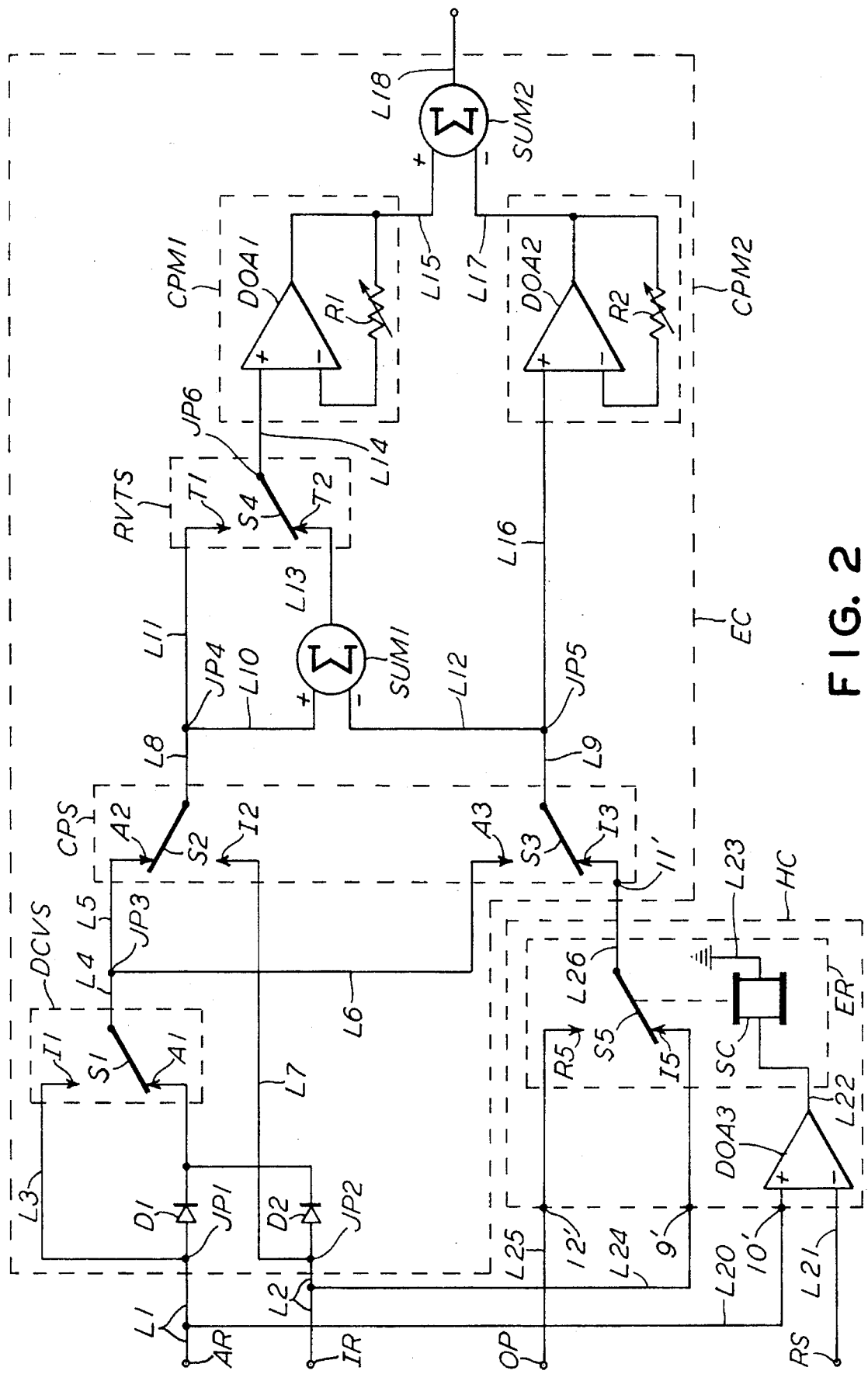
FIG. 2 is a schematic circuit diagram of a type of electronically control logic circuit employing a J-relay air valve emulator and an H-type relay air valve emulator for use in microprocessor-based electropneumatic locomotive air brake systems.

Referring now to FIG. 2, it will be observed that the functional operation of the J-1.6-16 relay valve software emulation routine is simulated by the electronic schematic circuit EC which is shown and described in my U.S. Pat. No. 5,104,203, issued Aug. 14, 1992, entitled *ARRANGEMENT FOR EMULATING A J-TYPE RELAY AIR VALVE USEABLE IN A RAILWAY BRAKING SYSTEM*, and assigned to the assignee of the present application. As shown, the automatic brake cylinder request or command terminal AR is connected to junction point JP1 by lead L1 while the independent brake cylinder request or command terminal IR is connected to junction point JP2 by lead L2. The junction point JP1 is directly connected by lead L3 to an inactive contact point I1 of a single-pole double-throw or position switch S1 which is representative of the double check valve selector DCVS for emulating the appropriate relay air valve. The junction point JP1 is also connected by diode D1 to an active contact point A1 of the two-position switch S1. In order to emulate a J-1.6-16 relay air valve, a movable heel contact of switch S1 is selected to be in contact with the active contact point A1.

It will be seen that the junction point JP2 is also connected by diode D2 to the active contact point A1. It will be noted that the movable heel contact of switch S1 is connected to junction point JP3 by lead L4. The junction point JP3 is directly connected by leads L4 and L5 and by leads L4 and L6 to the automatic contact points A2 and A3, respectively, of a pair of single-pole double throw or two-position switches S2 and S3 which simulate the control port selector CPS of the J-1.6-16 relay air valve. The junction point JP2 is directly connected to the independent contact point I2 of the switch S2 by the lead L7. In emulating the J-1.6-16 relay air valve, the movable heel contact of switch S2 is selected to be in contact with the automatic contact point A2 while the movable heel contact of switch S3 is selected to be in contact with the independent contact point I3. The movable heel contact of switch S2 is connected by lead L8 to junction point JP4 while the movable heel contact of switch S3 is connected to junction point JP5 by lead L9. It will be seen that junction point JP4 is connected by lead L10 to the positive (+) input of a first summing network SUM1 and is also connected by lead L11 to a contact point T1 of a single-pole double-throw or two-position switch S4 which is representative of the relay valve type selector RVTS. As shown, the junction point JP5 is connected to the negative (−) input of the first summing network SUM1 by a lead L12. The output of the first summing network SUM1 is connected by lead L13 to the contact point T2 of the two-position switch S4. It will be seen that the movable heel contact of switch S4 is selected to be in contact with contact point T2 of the relay valve type selector RVTS of the J-1.6-16 relay air valve. The junction point JP6 and the movable heel contact of switch S4 are arranged to be connected by lead L14 to the positive (+) input of a differential operational amplifier DOA1 which functions as a control port multiplier CPM1 to produce an output signal which is one hundred percent (100%) of the simulated piloting control pressure signal. It will be seen that a feedback path is connected from the output of the amplifier DOA1 to the negative (−) input via a variable resistor R1. The 100% output is connected to a first positive (+) input of a second summing network SUM2 via lead L15.

As shown, the junction point JP5 which represents the exhaust control pressure signal is connected by lead L16 to the positive (+) of a second differential operational amplifier DOA2. The amplifier DOA2 functions as the exhaust control port multiplier CPM2 to produce an output which is sixty percent (60%) of the simulated exhaust control pressure signal. It will be seen that a feedback path is connected from the output of the amplifier DOA2 to the negative (−) input via a variable resistor R2. The 60% output is connected to a second positive (+) input of the second summing network SUM2 via lead L17. Thus, the output signal appearing on lead L18 of the second summing network SUM2 will be 160% of the simulated control pressure demand request.

It will be understood that the functional operation of the H-5 relay air valve 1 of FIG. 1 is simulated by the schematic circuit diagram which is generally characterized by the designation HC and electronically represents the relay air valve emulator for the H-type of relay air valve. As shown, the electronic emulating circuit HC includes an operational amplifier comparator DOA3 and also an electromagnetic relay ER. It will be noted that the positive (+) input of the operational amplifier comparator DOA3 is connected to the automatic brake cylinder request terminal AR via lead L20. Conversely, the negative (−) input of the operational amplifier comparator DOA3 is connected by lead L21 to a reference voltage signal terminal RS which is representative of ten pounds per square inch (10 psi) of air pressure. The output of the operational amplifier comparator DOA3 is connected by lead L22 to one end of the solenoid relay coil SC while the other end of the solenoid coil SC is connected to ground via lead L23. The armature of the solenoid SC is linked to a movable or heel contact S5 which opens and closes the stationary contact points R5 and I5. It will be seen that the front contact point I5 is connected to the independent brake cylinder request terminal IR via leads L24 and L2 while the back contact point R5 is connected to the zero pressure (0 psi) terminal OP via lead L25. As shown, the heel contact S5 is connected to the independent contact point I3 via lead 26. In analyzing the emulating circuit of FIG. 2, it will be appreciated that an electrical input terminal 9', which is supplied by the independent brake cylinder request signal, is the counterpart of the pneumatic supply port 9 of the H-5 relay air valve 1 of FIG. 1. Likewise, the electrical input terminal 10' of the H-5 relay air valve emulating circuit HC receives input signals from the automatic brake cylinder request terminal AR which is equivalent to the control port 10 of the pneumatic relay air valve 1. Similarly, the terminal 12' which is connected to the zero pressure terminal OP is synonymous to the exhaust port 12 of the relay air valve 1. Further, the electrical output terminal 11' of the emulator HC is representative of the delivery port 12 of the relay air valve 1 of FIG. 1.

In operation, the control signal on the positive input terminal 10' is compared to the reference signal applied to terminal RS by the comparator DOA3. If the input signal on terminal 10' exceeds the reference signal which is equivalent to 10 psi, then the output on lead L22 is at a high signal level, namely, a logical "1" so that the solenoid coil SC will be energized. The energization of the solenoid causes the heel contact S5 to engage contact point R5 so that the zero pressure signal which appears on terminal OP is conveyed to output terminal 11'. Thus, the junction point JP5 representing the exhaust control pressure signal is at a zero voltage so that the amplifier DOA2 produces a zero voltage output. Accordingly, the output on lead L15 is simply the 100% of the simulated piloting control pressure signal appearing on the positive (+) input of the amplifier DOA1. Conversely, when the input signal on terminal 10' is less than the reference signal on terminal RS, the output signal on lead L22 is at a low signal level, namely, a logical "0" so that the solenoid coil SC is deenergized. The deenergization of the solenoid SC causes the armature to move the heel contact S5 to engage the stationary contact point I5 so that an electrical signal corresponding to the independent brake request is conveyed to the output terminal 11'. Under this condition, the output signal appearing on lead L18 is 160% of the simulated control pressure demand request since 60% of the simulated control pressure signal on contact point I5 is added to the 100% of the first positive input by the second summing network SUM2.

Figure 3:
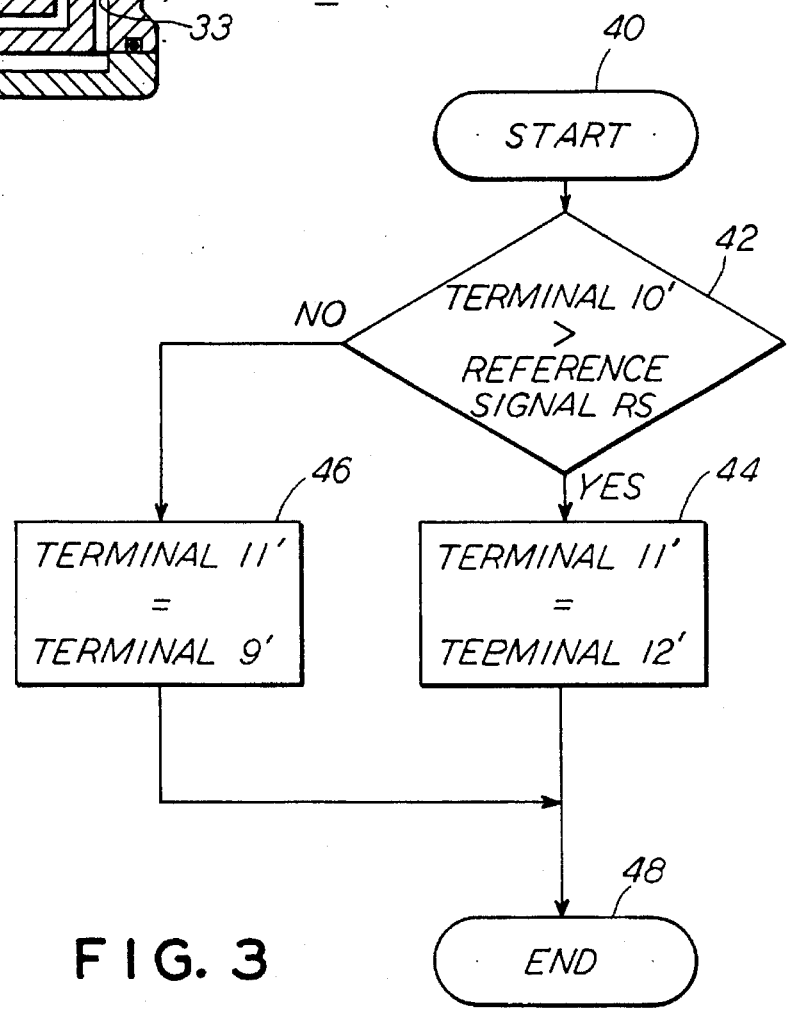
FIG. 3 is a flow chart illustrating the software controlled H-relay air valve emulation routine of the present invention.

Turning now to the flow chart of FIG. 3, It will be seen that a sequence of operations is initiated by a start signal emanating from the START block 40. The start signal is fed to the decision block 42 which outputs a "YES" if the signal level on terminal 10' is greater than the reference signal level on terminal RS and outputs a "NO" if the signal level on terminal 10' is less than the reference signal level on terminal RS. The "YES" output of the decision block 42 is fed to the block 44 which signifies that the output terminal 11" is connected to the input terminal 12' while the "NO" output is fed to the block 46. It will be observed that the outputs of both of the blocks 44 and 46 are fed to the END block 28 which terminates the subroutine of the H-5 relay air valve operation.

Thus, the present invention has been described in such full, clear, concise and exact terms as to enable any person skilled in the art to which it pertains to make and use the same, and having set forth the best mode contemplated of carrying out my invention. Further, I state that the subject matter which I regard as being my invention is particularly pointed out and distinctly set forth in what is disclosed and claimed.

It will be understood that various alterations and changes may be made by those skilled in the art without departing from the spirit and scope of the subject invention. Further, with the advent of microprocessors and minicomputers, it is evident that the various functions and operations may be effectively carried out and processed by a suitably programmed computer or EPROM device which is programmed to other compile time constants to process various inputs and produces the appropriate outputs. Therefore, it will be appreciated that certain modifications, ramifications, and equivalents will be readily apparent to persons skilled in the art and, accordingly, it is understood that the present invention should not be limited to the exact embodiment shown and described, but should be accorded the full scope and protection of the appended claims.

What I claim is:

1. An emulating circuit for simulating an H-type of relay air valve comprising, an operational amplifier comparator having a pair of inputs and an output, one of the pair of inputs connected to a reference signal, the other of said pair of inputs connected to an automatic brake cylinder request signal, a solenoid relay having a core connected to said output of said operational amplifier comparator and having at least one movable contact and a pair of stationary contacts, one of said pair of stationary contacts connected to an independent brake cylinder request signal and the other of said pair of stationary contacts connected to a zero pressure signal both of which are connectable by said at least one movable contact to an output terminal.

2. The emulating circuit for simulating an H-type of relay air valve as defined in claim 1, wherein said output of said operational amplifier comparator is at a high signal level when said automatic brake cylinder request is greater than said reference signal.

3. The emulating circuit for simulating an H-type of relay air valve as defined in claim 2, wherein said high signal level causes the energization of said coil of said solenoid relay.

4. The emulating circuit for simulating an H-type of relay air valve as defined in claim 3, wherein the energization of said coil of said solenoid relay results in said at least one movable contact engaging said other of said pair of said stationary contacts to establish a circuit path for said zero pressure signal to said output terminal.

5. The emulating circuit for simulating an H-type of relay air valve as defined in claim 1, wherein said operational amplifier comparator is at a low signal level when said automatic brake cylinder request signal is less than said reference signal.

6. The emulating circuit for simulating an H-type of relay air valve as defined in claim 5, wherein said low signal level results in the deenergization of said coil of said solenoid relay.

7. The emulating circuit for simulating an H-type of relay air valve as defined in claim 6, wherein the deenergization of said coil of said solenoid relay results in said movable contact engaging said one of said pair of stationary contacts to establish a circuit path for said independent brake cylinder request signal to said output terminal.

8. The emulating circuit for simulating an H-type of relay air valve as defined in claim 1, wherein said output terminal is an independent contact point of a control port selector of a J-relay air valve emulator.

9. The emulating circuit for simulating an H-type of relay air valve as defined in claim 8, wherein the connection of said at least one movable contact to said one of said pair of stationary contacts which is connected to said independent brake request signal results in the J-relay air valve outputting a signal which is 160% of a simulated control pressure demand request.

10. The emulating circuit for simulating an H-type of relay air valve as defined in claim 8, wherein the connection of said at least one movable contact to said other of said pair of said stationary contacts which is connected to said zero reference signal results in the J- relay air valve outputting a signal which is 100% of a simulated control pressure demand request.

\* \* \* \* \*